Figure 1:
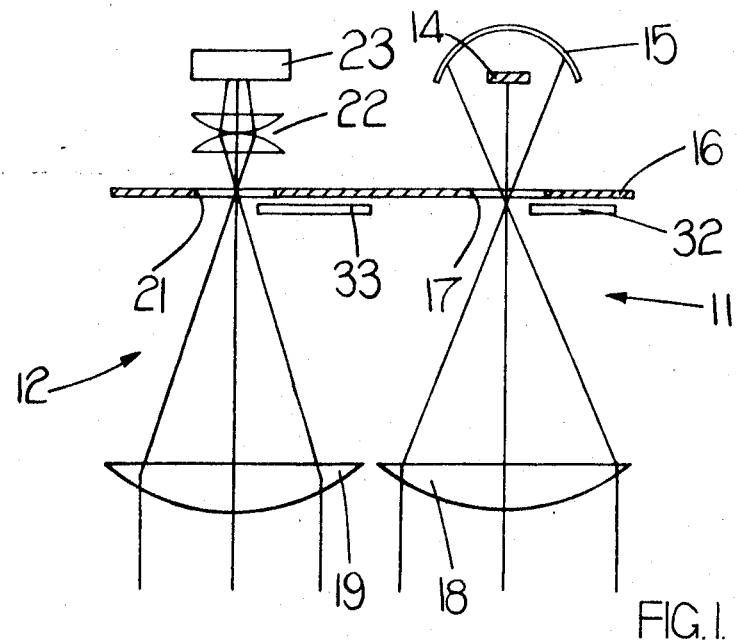

United States Patent [19]
Goodwin

[11] 3,736,416
[45] May 29, 1973

[54] LIGHTING SYSTEMS FOR ROAD VEHICLES

[76] Inventor: Alan Goodwin, 520 Hob Moor Road, Birmingham, England

[22] Filed: Nov. 11, 1971

[21] Appl. No.: 197,864

[30] Foreign Application Priority Data

Nov. 14, 1970 Great Britain.....................54,307/70

[52] U.S. Cl..............................................240/46.21
[51] Int. Cl...............................................F21v 11/18
[58] Field of Search .......................240/7.1 R, 8.1 R, 240/46.05, 46.17, 46.21, 46.25, 46.29, DIG. 6; 250/227

[56] References Cited

UNITED STATES PATENTS

| | | | |
|---|---|---|---|
| 3,486,066 | 12/1969 | Jones et al. | 240/46.29 X |
| 3,609,450 | 9/1971 | Hart | 250/227 X |
| 2,065,059 | 12/1936 | De Lima | 240/7.1 R |
| 3,444,385 | 5/1969 | Paglee | 250/227 |

*Primary Examiner*—John M. Horan
*Assistant Examiner*—Fred L. Braun
*Attorney*—Holman & Stern

[57] ABSTRACT

A lighting system for a road vehicle includes a projector for producing a well defined beam of light illuminating the road in front of the vehicle and a receiver including a light sensitive device for receiving light from a remote light source in front of the vehicle in use. The system includes a shutter movable in response to light received by the receiver, to cut off a sufficient amount of the projected beam to ensure that the projected beam does not fall on the remote light source, and the system includes a light directing arrangement for directing light from the projector into the receiver in the operative condition of the system where there is no remote light source in the field of view of the receiver.

6 Claims, 5 Drawing Figures

Patented May 29, 1973

3,736,416

2 Sheets-Sheet 1

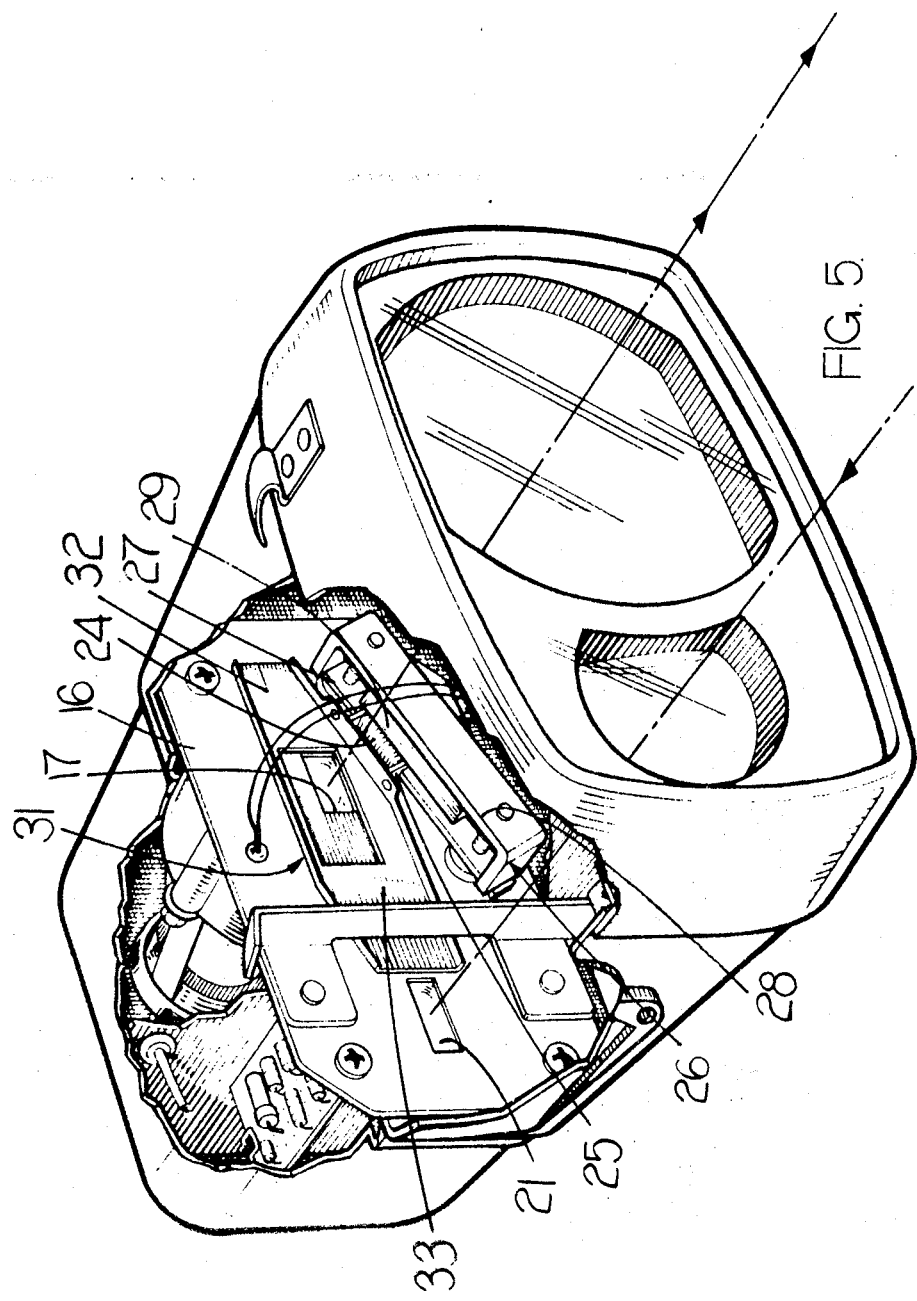

LIGHTING SYSTEMS FOR ROAD VEHICLES

This invention relates to lighting systems, for road vehicles, of the kind including a projector for producing a well defined beam of light illuminating the road in front of the vehicle in use, a receiver including a light sensitive device for receiving light from a remote light source in front of the vehicle in use, and means operable in response to light received by said receiver for cutting off sufficient of said projected beam to ensure that the projected beam does not fall on said remote light source.

A problem is encountered in such systems in that during operation of the system when no light is received by the receiver for long periods of time then the light sensitive device of the receiver does not react sufficiently rapidly when light is subsequently received.

It is an object of the present invention to provide a system wherein this problem is minimized.

According to the invention in lighting systems of the kind specified is provided a means for directing light onto said light sensitive means in the operative condition of the system where there is no remote light source in the field of view of the receiver.

Preferably the projector of the system includes a light source and a lens for producing a well defined beam of light, a mask having therein an aperture, and focusing means associated with the light source so that an image of said light source appears in said aperture and a well defined image of said aperture is projected forwardly to constitute said beam, said receiver includes a lens for projecting an image of a remote light source into a second aperture in a second mask and thence onto the light sensitive device, and said means operable in response to light received by said receiver includes a pair of interconnected shutters movable across said first and second apertures respectively, the shutters being moved to progressively close their respective apertures when light falls on the light sensitive device until a position is reached where the leading edge of the receiver shutter corresponds to the position of the image of the remote light source in the second aperture and wherein the projector shutter cuts off sufficient of the projected beam to prevent the projected beam falling on the remote light source.

Desirably the light of the secondary light source directed onto the light sensitive device is derived from the projector light source.

Preferably light is directed onto said light sensitive device from the projector light source by means of a light conductive device so arranged that the light path between the projector light source and the light sensitive device is only complete in a position of the shutters corresponding to a predetermined maximum opening of the first and second apertures.

Conveniently the light conductive device is carried by the assembly of said shutters and can only receive light from said light source in said position of the shutters.

Alternatively said light conductive device is stationary relative to said shutters and is masked from said light sensitive device by the receiver shutter except in said position of the shutters.

Figure 2:
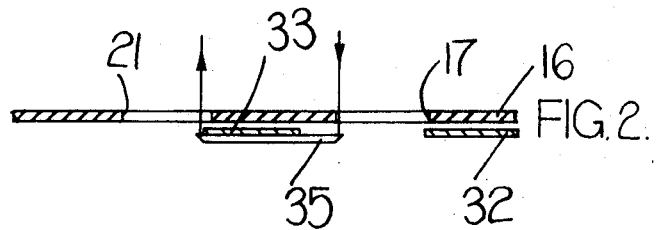
Figure 3:
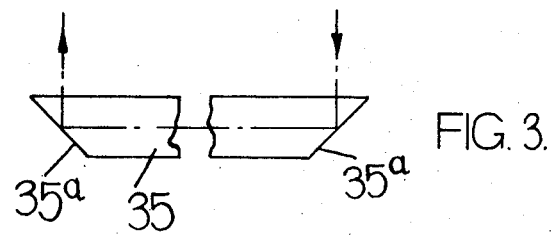
Figure 4:
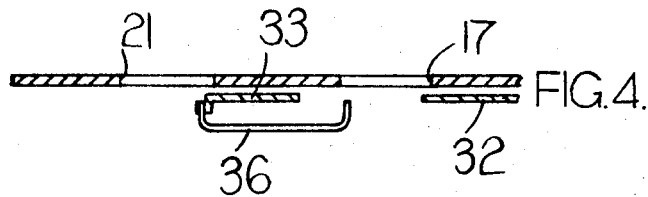

In the accompanying drawings,

FIG. 1 is a diagrammatic representation of a lighting system for a road vehicle to which the invention can be applied, FIG. 2 is a fragmentary diagrammatic representation of part of FIG. 1 showing a first example of the invention, FIG. 3 is an enlarged diagrammatic representation of part of FIG. 2, FIG. 4 is a fragmentary diagrammatic representation of part of FIG. 1 showing a second example of the invention, and FIG. 5 is a fragmentary perspective view of part of a practical embodiment of the arrangement illustrated in FIG. 1.

Referring to the drawings, the lighting system includes a light projector 11 and a light receiver 12 housed in a common casing not shown. The projector includes a bulb having an elongated filament 14 the center of which is situated at one focus of a part ellipsoidal dichroic mirror 15. Parallel to the filament 14 is a plate 16 defining a mask having therein a first aperture 17 of rectangular form. The center of the aperture 17 lies at the other focus of the mirror 15, and at the side of the plate 16 remote from the bulb is a converging lens 18. The lens 18 is spaced from the aperture 17 by a distance equal to its focal length, and so a well defined image of the aperture 17 is projected forwardly from the unit to define a well defined, divergent beam of light of accurately rectangular cross section.

The receiver 12 includes a converging lens 19 which is positioned on a front wall of the casing of the system along side the lens 18. Light from a remote light source, that is to say a light source in front of the system is collected by the lens 19, and is focused by the lens 19 into a second aperture 21 in the plate 16. The aperture 21 is also rectangular, and is aligned with the aperture 17. Thus an image of the remote light source is formed in the aperture 21. The light passing through the aperture 21 is collected by a condensor lens system 22 which projects an image of the lens onto a photo cell 23. The arrangement is such that the image falls on and almost fully covers the sensitized surface of the cell, the arrangement being such that the image falls centrally on the photocell 23 irrespective of the position of the image in the aperture 21. Of course if the image falls outside the aperture 21 then no light falls on the photo cell 23. The aperture 21 is of slightly larger dimension than the aperture 17, and the lenses 18, 19 are similar, and the optical axes of the receiver and the projector are parallel. Thus the receiver has a slightly larger field of view, than the field of illumination produced by the projector, and since the projector and the receiver are closely positioned relative to one another, then the receiver will see any light source within the field of illumination of the projector. The plate 16 is of course common to both the projector and the receiver, and so constitutes a pair of integral masks having therein respective apertures.

When light falls on the sensitized surface of the photo cell 23, then the photo cell 23 produces an electrical output which is amplified, and applied to a winding 24 wound on a spool 25 (FIG. 5). The spool 25 is slidably mounted on one limb 27 of a rectangular soft iron frame 26 secured to the plate 16 on the side thereof remote from the bulb 13 and the photo cell 23. Secured to the opposite limb 28 of the frame 26 is a permanent magnet 29, the north pole of the magnet 29 being in contact with the limb 26 throughout the length of the limb 26, and the south pole of the magnet 29 being parallel to, but spaced from the limb 27. Since the frame 26 is a complete magnetic circuit, then the frame 26 constitutes an extension of the north pole of the magnet. Thus part of the field of the magnet 29 extends between the south pole of the magnet 29 and the limb 27, at right angles to the limb 27. This part of the field of the magnet extends through the spool 25 and winding 24, and so when current flows in the winding 24 the spool 25 will be caused to move along the limb 27.

Secured to the spool 25 is a metal strip 31 having integral therewith, at opposite ends thereof, first and second shutters 32, 33. The shutters 32, 33 lie close to, and parallel to the plate 16, and the shutter 32 is associated with the aperture 17, while the shutter 33 is associated with the aperture 21. The spool 25, and therefore the shutters 32, 33 which are carried by the spool 25 are urged to a position wherein the apertures 21, 17 are fully closed by gravity, the spool sliding on the limb 27 of the frame 26, and the frame 26 being inclined to the horizontal when the system is normally mounted in use. When the system is switched on, the amplifier produces a current which is supplied to the winding 24 and results in movement of the spool and the shutters against gravity to a position wherein the apertures 17, 21 are fully open. When light falls on the photo cell 23, the photo cell 23 produces an output which is amplified and which causes the current flowing in the winding in a direction to maintain the apertures open, to cease. The output from the photo cell is applied to the winding and causes the shutters 32, 33 to be moved in a direction to close their respective apertures 17, 21.

The shutters continue to move until the leading edge of the shutter 33 prevents light from the remote light source passing through the aperture 21, whereupon the photo cell 23 ceases to produce an output. Thereafter the amplifier once again starts to supply an output which causes the shutters 32, 33 to begin to return towards their open position until light once again falls on the photo cell 23. Thus the shutters 32, 33 will hunt about a position wherein the leading edge of the shutter 33 is aligned with the image of the remote light source in the aperture 21. The amplifier circuit associated with the photo cell 23 and the spool 25 is so designed as to provide some measure of damping, and in addition if desired mechanical damping can be included. Thus the shutters 32, 33 come to rest with the leading edge of the shutter 33 aligned with the image of the remote light source in the aperture 21. In this position, the projected beam produced by the projector 11 has been progressively cut off from one side thereof by the movement of the shutter 32 across the apertures 17. Thus since the field of view of the receiver, and the field of illumination of the projector are very closely aligned, then the projected beam will not fall on the remote light source. Thus in the situation where the remote light source is the lights of an oncoming vehicle, then the driver of the oncoming vehicle will not be dazzled by the projected beam. The system is so arranged that the projected beam is cut off from the side of the beam remote from the near side of the road, that is to say in Britain, the left-hand side of the road. Thus the area of road along side the oncoming vehicle, and in the path of the vehicle equipped with the system will still be illuminated, while ensuring that the driver of the oncoming vehicle is not dazzled.

When the system is in use, at night and there is no remote light source within the field of view of the receiver, then the apertures of the receiver and the projector will be fully open, and no light will fall on the photo cell 23. The response characteristics of the photo cell include a time constant which results in a delay in operation of the system between the time when light first falls on the photo cell and the time when the photo cell produces an output sufficient to cause closing movement of the shutters, with the result that when the lights of an oncoming vehicle appear in the field of view of the receiver, then the receiver may not react sufficiently quickly to avoid momentary dazzling of the driver of the oncoming vehicle. In order to overcome this problem light is directed onto the photo cell 23 while the shutters are in a fully open position, so that the output of the photo cell 23 only has to rise by a small amount to cause closing movement of the shutters.

Desirably the light directed onto the photo cell is derived from the bulb 13 of the projector, and FIGS. 2 and 4 show two alternative ways in which this can be done. Referring first to FIG. 2, a strip 35 of transparent synthetic resin material is secured to the receiver shutter 33, and the opposite ends of the strip 35 are bevelled to define right angle prisms 35a at the opposite ends of the strip. Thus light entering one end of the strip at right angles to the length of the strip will be reflected by the angled surface at one end of the strip, will be conducted along the length of the strip, and will be reflected from the other angled surface at the other end of the strip so that the light leaves the strip parallel to the light entering the strip, but in the opposite direction. One end of the strip 35 just overlaps the leading edge of the shutter 33, and the length of the strip 35 is such that when the shutter 33 is in a position corresponding to maximum opening of the aperture 21, then the other end of the strip 35 just overlaps the aperture 17. It will be appreciated that the arrangement is shown exaggerated in FIG. 2 in the interests of clarity. Thus light will be directed by the strip 35 from the bulb 13 onto the photo cell 23. Of course the photo cell 23 will then produce an output, with a resulting movement of the shutters 32, 33 in a direction to move the shutter 33 to block the light passing through the aperture 21. The shutter 33 will not of course be able to block this light, since the strip 35 moves with the shutter 33, but a similar effect will be produced, since the opposite end of the strip 35 will be displaced from the aperture 17, and so no light will be received by the strip 35. At this point the photo cell 23 will cease to produce an output, and the shutters 32, 33 will be returned to a position wherein light once again falls on the end of the strip 35. As stated above the arrangement is damped, and the shutters 32, 33 rapidly reach an equilibrium position wherein some light from the bulb 13, transmitted by the strip 35 is falling on the photo cell 23.

In the arrangement shown in FIG. 4, the strip 35 is replaced by a length of optical cable 36 which is secured to the plate 16. One end of the optical cable 36 is positioned adjacent the leading edge of the aperture 17, so as to receive light from the bulb 13 while the opposite end of the optical cable 36 is positioned adjacent the trailing edge of the aperture 21, so that light conducted by the cable 36 is directed onto the photo cell 23 through the aperture 21. The shutter 33 can move between said other end of the cable 36 and the aperture 21, and so when light falls on the photo cell 23 from the cable 36 the shutters 32,33 are moved in a direction to cause the shutter 33 to block the light passing through the aperture 21. Once again, an equilibrium position is reached wherein light from the bulb 13 falls on the photo cell 23.

It will be appreciated, that in both constructions described above the photo cell 23 will be maintained in a sensitive condition, while the shutters 32,33 are in a position corresponding to maximum opening of their respective apertures. The two arrangements described also have the added advantage that the positioning of the strip 35, or the cables 36 defines the maximum opening position of the shutters 32,33.

In lighting systems of the type described above it is desirable that the system shall not be operated by its own reflected light. For example, assuming that a vehicle equipped with the system approaches a reflective wall then light from the projector could be reflected from the wall back into the receiver, so that the system is operated unecessarily. In order to minimize this occurance the mirror 15, as stated above, has a dichroic coating, the dichroic coating being arranged to transmit the red and infrared wave lengths of the light produced by the filament 14, while reflecting the remaining wave lengths to constitute the projected beam. Thus the projected beam is substantially devoid of red and infra-red wave lengths. The photo cell 23 is chosen to be particularly sensitive to the red and infra-red wave lengths of light, and so the risk of operation of the system by its own reflected light is minimized. It will be appreciated however that the system will of course be operated by the conventional dipped or main beam headlights of an oncoming vehicle, or even by the side lights of an oncoming vehicle, and will also be operated by the tail lights of a vehicle travelling in the same direction in front of the vehicle equipped with the system, since none of these light sources on other vehicles will have the red and infra-red wave lengths removed.

The photo-cell 23 is not exclusively sensitive to red and infra-red wave lengths, and the dichroic coating of the mirror 15 does not totally remove the red and infrared wave lengths from the projected beam. Thus the light conducted by the strip 35, or alternatively by the optical cable 36 will still be capable of operating the photo cell 23.

I claim:

1. A lighting system for a road vehicle, including a projector having a light source for producing a well defined beam of light illuminating the road in front of the vehicle in use, a receiver including a light sensitive device for receiving light from a remote light source in front of the vehicle in use, means operable in response to light received by said receiver for cutting off a sufficient amount of said projected beam to ensure that the projected beam does not fall on said remote light source, and, means for directing a portion of the light emitted by the projector onto said light sensitive means in the operative condition of the system where there is no remote light source in the field of view of the receiver.

2. A system as claimed in claim 1 in which the light directed onto the light sensitive device is derived from the projector light source.

3. A system as claimed in claim 1 in which the projector includes a lens for producing a well defined beam of light, a mask having therein a first aperture, and focusing means associated with the light source so that an image of said light source appears in said aperture and a well defined image of said aperture is projected forwardly to constitute said beam, said receiver including a lens for projecting an image of a remote light source into a second aperture in a second mask and thence onto the light sensitive device, and said means operable in response to light received by said receiver including a pair of interconnected shutters movable across said first and second apertures respectively, the shutters being moved to progressively close their respective apertures when light falls on the light sensitive device until a position is reached where the leading edge of the receiver shutter corresponds to the position of the image of the remote light source in the second aperture and wherein the projector shutter cuts off a sufficient amount of the projected beam to prevent the projected beam falling on the remote light source.

4. A system as claimed in claim 3 wherein said means for directing a portion of the light onto the light sensitive device from the projector light source is a light conductive device so arranged that the light path between the projector light source and the light sensitive device is only complete in a position of the shutters corresponding to a predetermined maximum opening of the first and second apertures.

5. A system as claimed in claim 4 in which the light conductive device is carried by the assembly of said shutters and can only receive light from said light source in said position of the shutters.

6. A system as claimed in claim 4 in which the light conductive device is stationary relative to said shutters and is masked from said light sensitive device by the receiver shutter except in said position of the shutters.

* * * * *